W. C. HEDGCOCK.
BRAKE RELEASE.
APPLICATION FILED FEB. 11, 1915.
1,143,705.
Patented June 22, 1915.
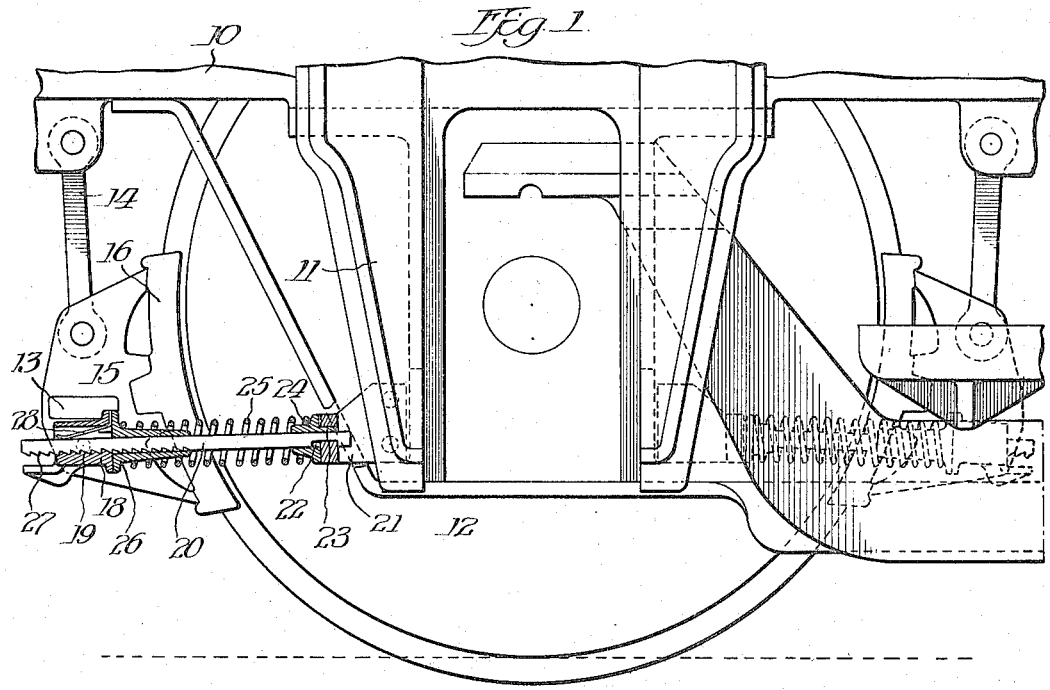
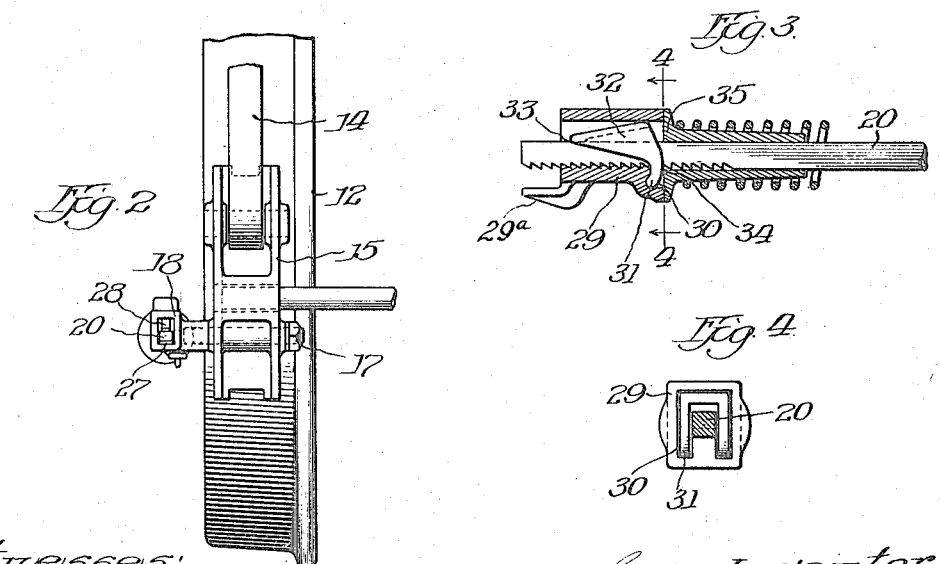
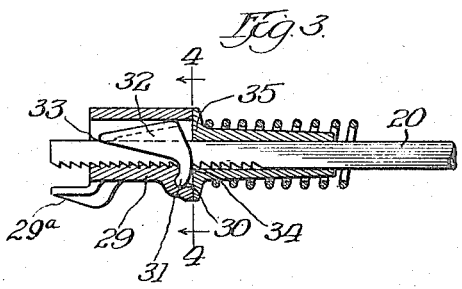
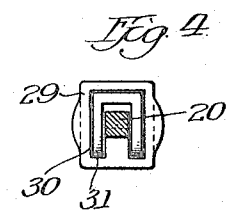
Witnesses:
Inventor
William C. Hedgcock
By C. C. Linthicum
Atty.

UNITED STATES PATENT OFFICE.

WILLIAM C. HEDGCOCK, OF CHICAGO, ILLINOIS, ASSIGNOR TO AMERICAN STEEL FOUNDRIES, OF CHICAGO, ILLINOIS, A CORPORATION OF NEW JERSEY.

BRAKE-RELEASE.

1,143,705.   Specification of Letters Patent.   Patented June 22, 1915.

Application filed February 11, 1915. Serial No. 7,465.

*To all whom it may concern:*

Be it known that I, WILLIAM C. HEDGCOCK, a citizen of the United States, and resident of Chicago, in the county of Cook and State of Illinois, have invented certain new and useful Improvements in Brake-Releases, of which the following is a specification.

My invention relates to railway brakes and has particular reference to a novel release for displacing the brake shoes from the wheel after the braking force has been removed.

It is well understood that means should be provided for resiliently opposing the brake applying force to the end that the brake shoes may be removed from contact with the wheels after the braking force has been discontinued. A particular object in such devices is simplicity and cheapness in manufacturing cost. Furthermore a device of this sort is most effective throughout a long period when coiled springs are used, such springs having less tendency toward a loss of resiliency. Furthermore, by the use of a comparatively short coiled spring a sufficient degree of movement is permitted.

A further object is to provide means in connection with such a brake release whereby the amount of movement of the brake shoes from the wheel is limited, and this amount is maintained at a substantially constant point irrespective of the wear on the surface of the wheel or on the brake shoes.
This is secured by providing a limiting bolt, this bolt being bodily moved to the extent required to apply and release the brakes. However, as wear occurs between the shoe and the wheel this wear is taken up by the bolt and the shoe is released from the surface of the wheel only to the required extent.

The invention will be more readily understood by reference to the accompanying drawing, wherein, Figure 1 is an elevation of a portion of a car truck to which my improvements have been applied; Fig. 2 is a fragmentary view taken at right angles to that of Fig. 1; Fig. 3 is a sectional detail of a modified form of take-up device; and, Fig. 4 is a section on the line 4—4 of Fig. 3.

Referring to the drawings it will be seen that my invention may be applied to a car truck having a frame member 10, pedestal 11, wheels 12, brake beam 13, hanger 14, brake head 15 and brake shoe 16. Mounted on a bolt 17, and projecting through the brake head 15, is a bracket or thimble 18, having an axial opening the lower portion of which is toothed, as at 19, in Fig. 1. A rod 20, is secured at one end in a bracket 21, secured to the truck pedestal, the rod being provided with a notch 22, at the point of engagement with the bracket. The opening through the bracket is of greater height than the thickness of the rod 20, at the point of engagement with the bracket, the space in the opening being filled after the rod is inserted by means of a lip 23, carried by a ferrule 24, which ferrule provides a seat for the coiled spring 25. It will be noted that the notch in the rod 20, is of an extent greater than the width of the bracket at the point of engagement therewith, this permitting a limited bodily movement of the rod. The opposite end of the spring 25, bears against a thimble 26, which thimble in turn abuts the portion 18, heretofore described. The lower edge of the rod 20, is toothed as at 27, to engage the teeth 19, being held in engagement therewith by means of a spring 28.

The operation is as follows: Assuming the parts to be in the position of Fig. 1, the brake may be applied and the spring 25, compressed. After the brakes are released the spring will force the brake head and shoes out of engagement with the wheel. As wear occurs between the shoe and wheel, the movement will become greater than that permitted by the cut-out portion 22, in the rod. Thereupon the brake head will be forced inwardly and the notches 19, 27, will have a new engagement. Thereafter the brake head cannot return to an extent greater than is permitted by the notch 22, in the rod. As wear continues it will be taken up by the means provided and the distance between the brake shoe and wheel will remain substantially constant. This is a desirable feature which will be readily understood by those skilled in the art.

In the modified form shown in Figs. 3 and 4, I have eliminated the spring 28, and have provided a bracket member 29, having a notch 30, therein, which notch accommodates the toe 31, of a locking element 32. This element, as shown in Fig. 4, straddles the rod 20, and bears against the same at the point 33. The member 32, is contacted at the point 34, by the thimble 35, and held in the position shown in Fig. 3. An inward movement of the bracket 29, will be permitted but an outward movement will not be permitted. When it is desired to release the rod from the bracket, a tool is placed between the bracket 29ª, and the end of the rod and the rod forced upward. This will move the thimble 35, and slightly compress the spring but will permit the disengagement of the rod 20.

I claim:

1. In a device of the class described, the combination of a truck frame, a brake head, a spring extending between said frame and said head, a rod also extending between said frame and head, means associated with said rod for permitting limited movement of said head toward and away from a wheel in all conditions of wear of the brake elements, substantially as described.

2. In a device of the class described, the combination of a truck frame providing a stop, a brake head, spring means bearing on said stop and said brake head and tending to maintain said head away from the wheels, a rack and pawl extending between said head and stop and being fixed to one thereof, said rack and pawl permitting freedom of movement of said head in one direction and preventing more than limited movement in an opposite direction, substantially as described.

3. In a device of the class described, the combination of a truck frame providing a stop, a brake head, a spring extending between said stop and head and urging said head away from the wheels, a rack and pawl mechanism extending between said stop and head, said rack having a sliding connection with one of said elements, permitting limited freedom of bodily movement, said pawl permitting freedom of movement in one direction and preventing movement in an opposite direction, substantially as described.

4. In a device of the class described, the combination of a truck frame having a bracket, a brake head, a rack extending between said bracket and said head, a spring mounted on said bracket and tending to urge said head away from a wheel, said rack having a notch in one end thereof, said notch providing for a limited bodily movement of said rack, and a pawl engaging said rack and permitting freedom of movement in one direction while preventing movement in an opposite direction, substantially as described.

5. In a device of the class described, the combination of a truck frame having a bracket, a notched rack engaging said bracket, a spring mounted on said rack, a brake head against which said spring is adapted to act, a pawl carried by said brake head and adapted to engage said rack whereby said brake head is permitted limited freedom of movement in both directions and additional movement in one direction because of a new engagement of said pawl, substantially as described.

Signed at Chicago, Ill., this 9th day of February, 1915.

WILLIAM C. HEDGCOCK.

Witnesses:
C. F. MURRAY,
T. D. BUTLER.